C. MOLL.
CORN PLANTER.
APPLICATION FILED AUG. 2, 1915.
1,214,577.
Patented Feb. 6, 1917.
3 SHEETS—SHEET 1.
Fig. I.
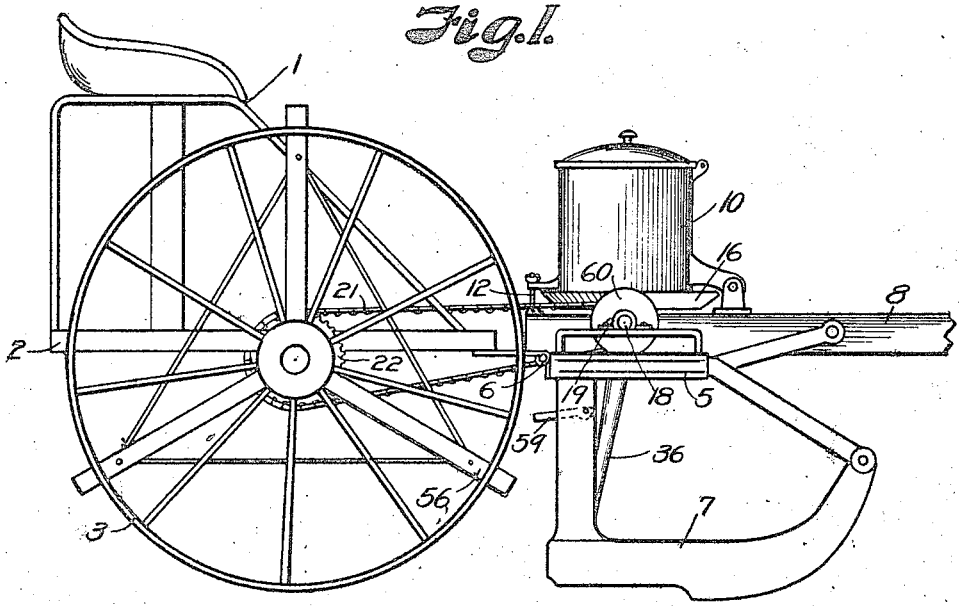
Fig. II.
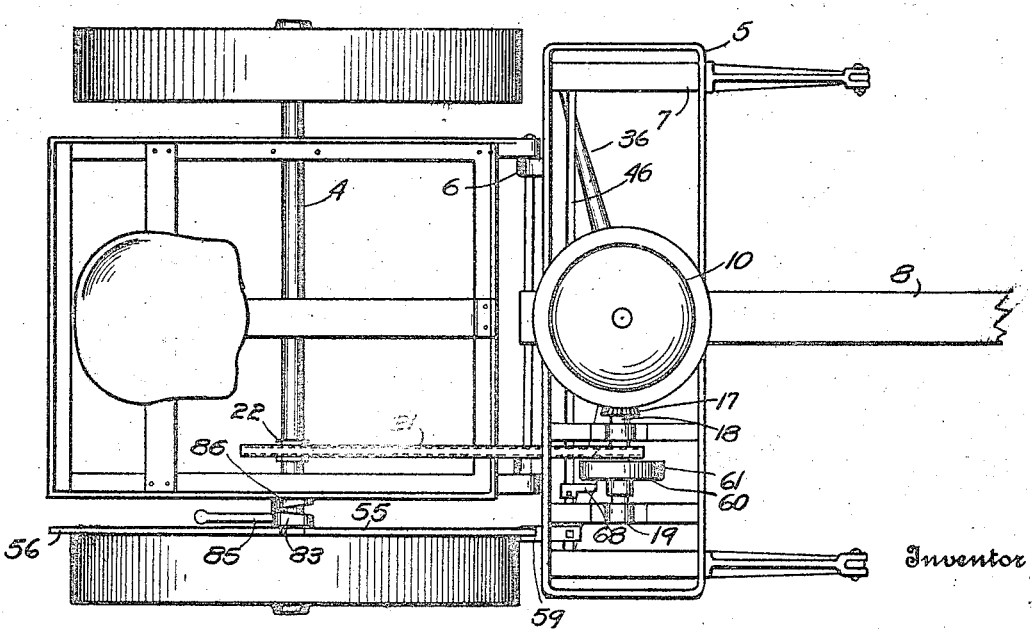
Inventor
Clinton Moll
By
Arthur B. Brown
Attorney

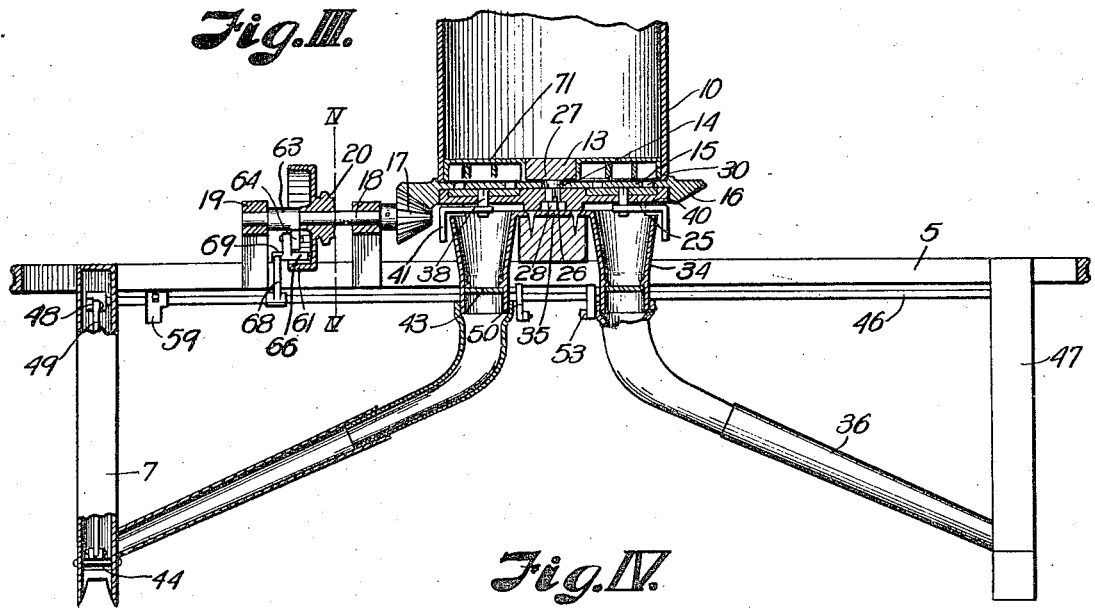

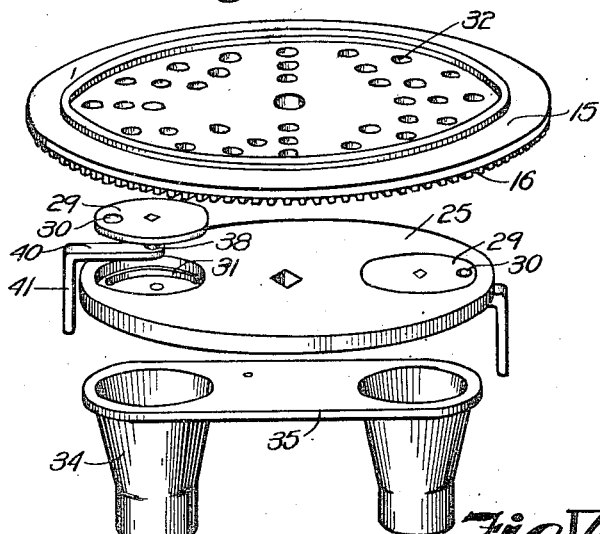
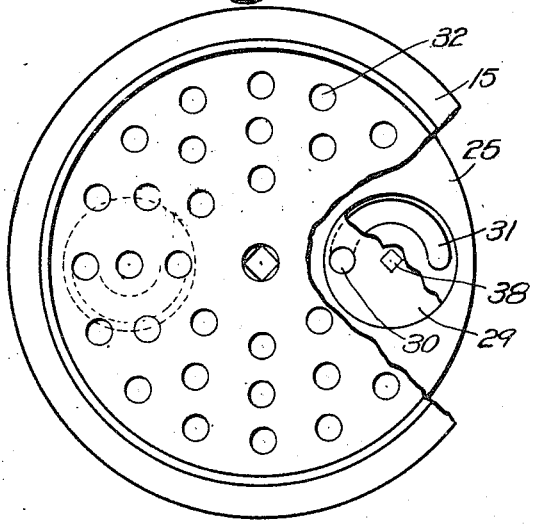
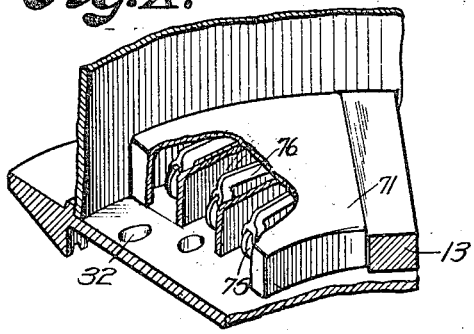

UNITED STATES PATENT OFFICE.

CLINTON MOLL, OF OLATHE, KANSAS.

CORN-PLANTER.

1,214,577.  Specification of Letters Patent.  Patented Feb. 6, 1917.

Application filed August 2, 1915. Serial No. 43,126.

*To all whom it may concern:*

Be it known that I, CLINTON MOLL, a citizen of the United States, residing at Olathe, in the county of Johnson and State of Kansas, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to seed planters, and more particularly to a planter of that character whereby seed is deposited at equally spaced intervals during the travel of the planter across a field.

In the ordinary check row planter the seed dropping mechanism is operated by means of a checking wire which is stretched across the field and provided with spaced buttons for rocking a tripping arm on the dropping mechanism as the latter slides along the wire to actuate the tripping mechanism and effect the seed dropping operation.

It is the object of the present invention to provide a check row corn planter which will obviate the necessity for the checking wire, by comprising valve tripping mechanism within the planter, thereby saving time in planting, and lessening the weight of the machine and the number of its working parts.

A further object of the invention is to provide a hilling plate whereby the number of seeds deposited in each hill may be varied.

In accomplishing these objects I have provided improved details of structure, the preferred forms of which are illustrated in the accompanying drawings, wherein:—

Figure I is a side elevation of a planter embodying my invention. Fig. II is a plan view of the same. Fig. III is an elevation of the grain hopper and planting runners, shown partly in section. Fig. IV is a vertical section on the line IV—IV, Fig. III, showing the operating mechanism for the upper valve. Fig. V is a sectional view of one of the planter and checking wheels. Fig. VI is an elevation of part of one of the runners, parts being broken away to show the valve mechanism. Fig. VII is a perspective view of the hilling plates shown in spaced relation. Fig. VIII is a plan view of the hilling plates, parts being broken away for better illustration. Fig. IX is a vertical section of one of the knocker housings. Fig. X is a perspective view of a part of the seed hopper, showing one of the knocker housings. Fig. XI is a perspective view of parts of the check wheel and planter wheel hub, showing the clutch mechanism. Fig. XII is a detail of the drive clutch.

Referring more in detail to the parts: 1 designates a planter constructed according to my invention and comprising a frame 2, traveling wheels 3 on an axle 4, that supports the frame 2 and is revolubly mounted in suitable boxes secured to the under face thereof, a runner frame 5, which is hingedly connected to the frame 2, by links 6, and is supported at its ends by planting runners 7, and a tongue 8 that is supported on the runner frame and by which the planter is drawn.

Centrally located above the runner frame 5, is a grain hopper 10, which is hingedly mounted on the tongue 8 so that it may be tipped forwardly to give access to the hilling plates, presently described, and is held in proper relation to the seed conduits by a pivoted latch bolt 12.

Extending across the base of the hopper 10 is a cross bar 13 (Figs. III, IX and X), provided with a downwardly projecting center stud 14 on which is revolubly mounted a hilling plate 15; the periphery of which lies outside of the hopper and has a bevel gear 16 on its under face for meshing with a pinion 17 on a shaft 18 that is revolubly mounted in spaced bearings 19 on the runner frame 5.

The shaft 18 is driven intermittently by a clutch mechanism, presently described, which in turn is driven by a sprocket wheel 20, that is actuated by a chain belt 21 that runs over a larger sprocket wheel 22 on the axle 4; the parts being mounted so that the sprocket wheel 20 is driven continuously with the axle 4 but the shaft 18 carrying the wheel is only driven when the clutch is thrown into operation.

Supporting the hilling plate 15 and located beneath the hopper 10 is a disk 25, which is mounted on the squared portion 26 of the stud 14 and seats against a shoulder 27 intermediate the round and the squared parts of said stud, so that the hilling plate 15 may revolve freely while the disk 25 is retained stationary; the two disks being secured on the stud by means of a lock nut 28 to close the lower end of the hopper.

Inset within the upper face of the disk 25 at diametrically opposite sides of and equal distances from the center of the plate are sockets 29', and rotatably mounted in said sockets with their upper faces flush with the disk 25, are selecting plates 29, each provided, near its outer edges, with a port 30, which is adapted for delivering to a semicircular slot 31 in the supporting disk, and which may be made to register with any one of a plurality of concentric rows of ports 32 in the hilling plate 15.

The ports 32 in the hilling plate are of such size that but one seed may be carried therein at a time, and the number of such ports in each of the concentric rows increases as the rows approach the edge of the disk, i. e., the inner row, here shown, contains eight ports, the next twelve ports, and the outer row sixteen ports, so that should the port 30 of the selecting plate be turned to register with the inner row of ports 32, there will be eight registering periods for each complete revolution of the hilling plate, and eight seeds will be dropped at each side of the hopper. Likewise should the ports 30 be turned to register with the outer circle of ports, sixteen seeds would be dropped from each side of the hopper at each revolution of the hilling plate. When a seed is dropped from the hopper, through the hilling and selecting plates, it is caught in a seed cup 34 that is supported directly beneath the hopper by a bracket 35 that is secured on the tongue 8; each of the cups being provided with a telescoping, conveying tube 36 which leads to its corresponding planting runner.

In order that the selecting plates may be turned easily and quickly to register with any desired row of ports 32, I provide each of the plates with a central stud 38, which extends through and below the disk 25, and is provided with an outwardly projecting arm 40, having downturned ends 41 by which the disk may be revolved within its housings, and which is adapted for movement along numerals or marks (not shown) on the face of the cups 34, to indicate the position of the disks with reference to the hilling ports to designate the number of seeds being dropped in each hill.

To insure that the selected number of seeds may be dropped from the hopper and deposited at regular intervals, and to avoid scattering the seed along the row, I have provided each of the cups 34 with a catch valve 43, and place a second catch valve 44 at the lower end of each seed tube; the last valve being in close relation to the depositing point, so that when the seeds are dropped through the second valve they have no opportunity to scatter, as would be the case should it have an extended travel of the ground, as from the first valve. All of the valves are opened simultaneously by means of a trip shaft 46 that extends across the frame 5 and is journaled in the tubular runner standards 47. Fastened within the standards 47, and fixed on said shaft 46 are levers 48 which are connected with the hinged valves 44 by links 49 so that the valves are opened by the actuation of the shaft 46. The cup valves 43 are mounted on stud shafts 50 that project to the outside of the cups and are operated by levers 51 that are fastened thereto and are connected with like levers 52 on the trip shaft 46 by links 53; all of the said valves being normally held closed by the coil springs 54 at opposite ends of the shaft; each having one end attached to the outer end of lever 48 and the opposite end secured at the top of the runner standard.

To trip the valves at regular intervals as the planter is drawn across the field, I provide a checking wheel 55, which comprises three radial arms 56, formed integral with a hub 57 that is revolubly mounted on the axle 4 intermediate the planter wheel hub and the frame 2; the said arms extending slightly beyond the periphery of the planter wheel to engage a trip lever 59 on the shaft 46 to partly revolve the latter and momentarily open all of the valves, thus allowing the seed held at the last valve to be dropped in the furrow, and that held at the first valve to be dropped and caught by the other valve. As this action takes place, the driving clutch, previously mentioned, is thrown into operation to revolve the shaft 18 and gear 17, which, in turn, revolves the hilling plate 15 to replace the seed dropped by the cup valves.

The clutch mechanism comprises a disk 60 integrally formed with and somewhat larger than the sprocket wheel 20 and having a peripheral flange 61 provided with a scalloped inner face 62. Fixed to the shaft 18 adjacent the disk is a collar 63 having a stub arm 64, which pivotally carries a clutch arm 65 that has an end lug 66 adapted for engaging the inner face of the disk flange 61 and is normally urged toward the flange by a spring 67 that is fastened thereto and to the outer end of the arm 64, so that when in this locked position the shaft 18 is revolved by the sprocket 20 to actuate the hilling plate 15. Normally the clutch arm carrying the lug 66 is held out of engagement with the clutch flange by a lever 68 that is fastened on the trip shaft 46 and is so placed that it will contact an extension 69 on the arm 65 to cause the lug 66 to be unseated and thereby allow the disk 60 to revolve freely on the shaft 18, but as the trip shaft 46 is partly revolved by the contact of one of the check wheel arms with the trip lever 59, the lever 68 is momentarily thrown outwardly, which allows the clutch arm 65 to be drawn inwardly by the spring 67 to engage the face 62 of disk 61 and the shaft 18 is again revolved one revolution. By this arrangement the hilling plate runs intermittently or only when the trip shaft is actuated by the checking valve. In this instance, I prefer to make the diameter of the gear 17 one-fourth the diameter of the hilling plate 15, so that with one revolution of the shaft 18 the hilling plate will make one-fourth of a revolution.

It will be seen that by the gearing described, the parts 30 of the selecting plates 29 are made to register with the outer rows of apertures 32 of the hilling plate, so that four seeds will be dropped at each hill or at each action of the tripping mechanism and likewise the inner row will drop two seeds.

To insure regular and certain dropping of the seed, and to prevent the seed from clogging in the hopper, I provide knockers 70 that are mounted within housing boxes 71, that are secured to the crossbar 13 by bolts 72, so that the closed housings closely overlie the hilling plate and are directly over the selecting plates 29. The said knockers comprise the spaced rollers 75 that are revolubly mounted on arms 76 and are so placed that a roller tracks with each of the concentric rows of ports 32 in the hilling plate; the arms 76 being pivotally mounted at their upper ends and urged downwardly by springs 77. As the hilling plate revolves with the hopper, one seed will be nested in each of the ports 32 and will be carried beneath the housing, and as the ports 32 and selecting plate apertures 30 come in registration the seed is pushed therethrough into the seed cup below, by the downward pressure of the roller 75.

When the parts are in operation, the checking wheel turns with the planter wheel 3; the two wheels being connected by a clutch mechanism comprising the outstanding teeth 80 on the inner face of the planter wheel hub (Fig. XI) which are adapted to mesh with the notched edge 81 of an outstanding ring 82 on the checking wheel and are normally held seated in the position by a tightening sleeve 83 that is revolubly mounted on the axle 4 and which may be revolved by a lever 85. In making the sleeve 83, one end is cut on a bevel to engage the beveled end of a like sleeve 86 that is fixed to the frame 2. When the two beveled faces are turned at different angles it will be seen that the checking wheel will be held tightly against the planter wheel, and they will turn together. To throw the clutch out of gear it is only necessary to reverse the lever 85, which shortens the space taken up in the axle 4 by the two sleeves and allows the checking wheel to be forced outwardly by the pressure of a coil spring 88 interposed between the planter wheel and checking wheel hubs which separates the two sufficiently to disengage the teeth 80 from the notched ring 82 and allow the checking wheel to travel freely on the shaft and out of line with the tripping lever 59. If it is desired to use the planter for drilling purposes it is only necessary that the checking wheel be thrown out of operation and the valves held open in any suitable manner, which will also disengage the lever 68 from the clutch mechanism and allow the shaft 18 to be driven continuously and the seed to have free passage from the hopper to the planting runners. Presuming the planter to be so constructed, the driver, at the start of each trip across the field, adjusts the checking wheel so that the valves will be tripped at the proper point to insure that the hills of the row to be planted will be in alinement with corresponding hills of the preceding rows; the runner and check wheel being so spaced that the check wheel arms will leave depressions directly over each planted hill to designate its location.

By so constructing and assembling the parts it will be seen that a light and substantial planter is provided having a checking means that does not require the adjustment or carrying of a checking wire, thereby saving much time and inconvenience to the driver. It will also be seen that the planter can be used either for hilling or drilling the seed and by the changing of the hilling plates seed of different kinds and sizes may be planted.

Having thus described my invention, what I claim as new therein, and desire to secure by Letters-Patent, is:—

1. The combination with a container, having a bottom provided with delivery openings, of a valve plate located beneath the container, and having an arcuate slot, a disk rotatably mounted on the valve plate and having openings adapted for constant communication with the slot in said plate and for variable communication with the openings in the container bottom, means for adjusting said valve disk and a conduit adapted for receiving grain from the arcuatile slot.

2. The combination with a container, having a bottom portion provided with a plurality of openings, each opening being adapted for containing a single grain, and the number of openings in each set varying as to number, a valve member having an opening adapted for registration with the openings in the container bottom, a support for the valve member, having a slot adapted for delivering the grain from the valve opening, means for adjusting the valve member, and a conduit adapted for receiving grain from the valve opening to conduct said grain to delivery position.

3. The combination with a container, having a perforated bottom, of means for revolving the container bottom, valve mechanism below the container for controlling the delivery of grain from the container through the bottom openings, a housing in the bottom of the container, an arm pivotally mounted in the said housing and having a roller on its free end adapted for travel in the bottom of the container and for projection into said openings, a stud slidably projected through the arm, and a spring on said stud to urge the arm toward the bottom of the container.

4. The combination with a container, of a disk rotatably mounted in the bottom of the container and having a plurality of rows of apertures therein, a slotted disk located beneath said rotatable disk, a plate adjustably mounted in said slotted disk and having an aperture adapted for establishing communication between the container disk apertures and the disk slot, means for positioning the plate to register its aperture with apertures in either row in the container disk, and means for rotating the container disk, for the purpose set forth.

5. The combination with a container, of a rotatable disk forming the bottom of the container and provided with apertures, a relatively fixed disk having sockets facing the container disk and provided with slots, a plate rotatable in each of said sockets and having an aperture in communication with the relative slot and adapted for communication with apertures in the rotatable disk, means for adjusting the plates, conduits adapted for receiving seed from the fixed disk slots, means for actuating the rotatable plate, and a checking device for controlling said means.

In testimony whereof I affix my signature.

CLINTON MOLL.